Nov. 21, 1933.  C. R. BRADEN  1,936,006
HARVESTER GUARD
Filed Jan. 9, 1933
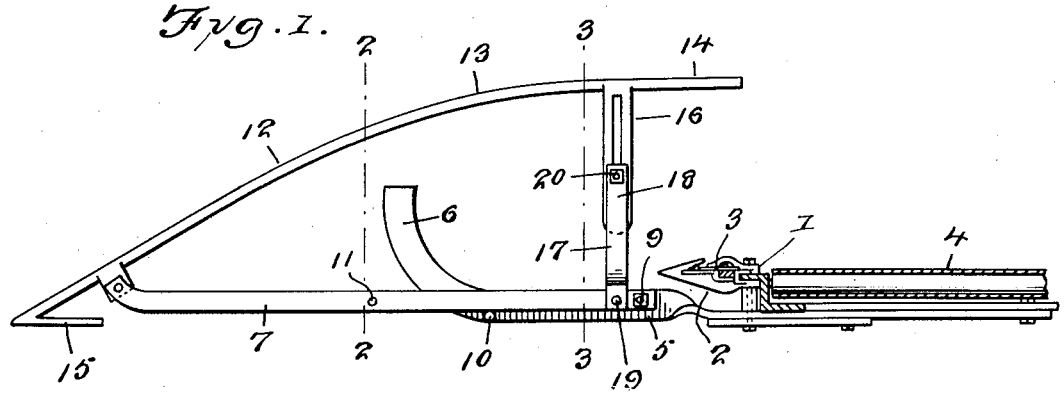
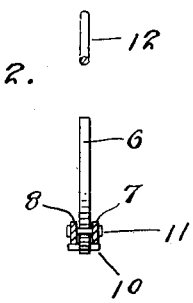
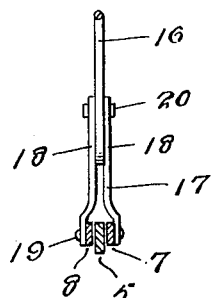
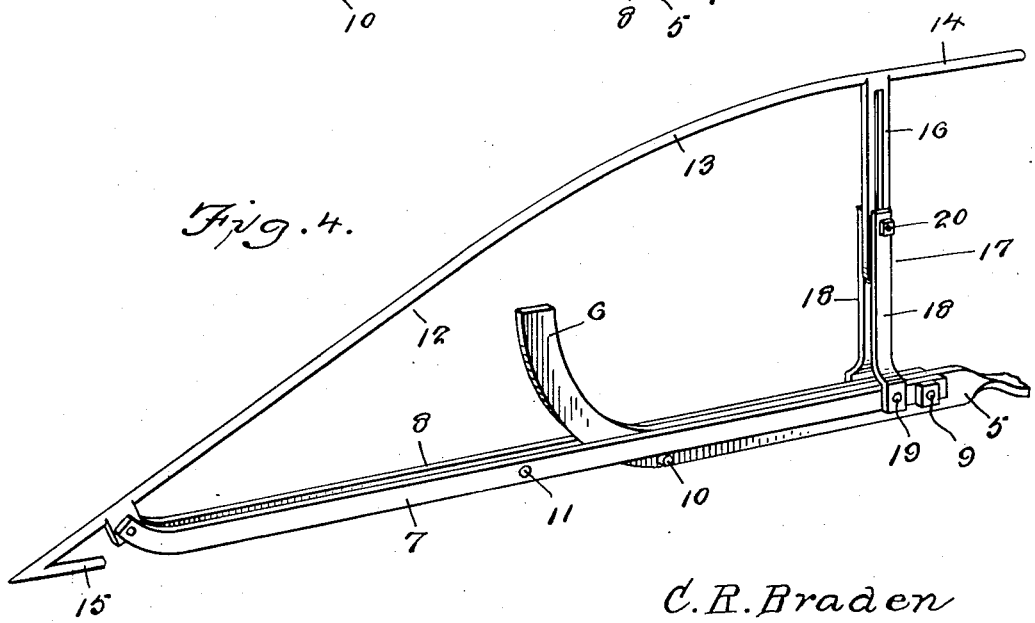
C. R. Braden
INVENTOR
BY Victor J. Evans & Co.
ATTORNEY Patented Nov. 21, 1933

1,936,006

UNITED STATES PATENT OFFICE 1,936,006

HARVESTER GUARD

Coe R. Braden, Winthrop, Iowa

Application January 9, 1933. Serial No. 650,908

4 Claims. (Cl. 56—314)

This invention relates to improvements in guards of the character employed in my U. S. Letters Patent granted March 1, 1932 and numbered 1,847,234 and has for the primary object, the provision of a simplified and more practical construction whereby the guard may have a limited pivotal movement so as to readily follow unevenness of the ground and also provision being made to allow the inclination of the elevator portion of the guard to be varied.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a guard constructed in accordance with the present invention and showing the same applied to a fragmentary portion of a harvester.

Figure 2 is a sectional view taken on the line 2—2 of Figure 1.

Figure 3 is a similar view taken on the line 3—3 of Figure 1.

Figure 4 is a perspective view illustrating the guard.

Referring in detail to the drawing, the numeral 1 indicates a fragmentary portion of a harvester wherein the sickle bar is shown at 2 and the sickle at 3, both arranged in advance of a conveyor or apron 4 adapted to feed severed growth to the usual binding mechanism of the harvester. A supporting arm 5 is suitably secured to the harvester and projects forwardly of the sickle with the forward end thereof curved upwardly to form a guide 6. A bar 7 consisting of spaced parallel members 8 is pivoted to the arm 5, as shown at 9, and extends forwardly of the forward end of said arm. The plates 8 of the bar 7 are arranged at opposite sides of the supporting arm and normally rest upon a stop 10 carried by the arm 5. The plates 8 are connected by a pin 11 adapted to act as a stop by engaging the portion 6 of the arm 5 to limit the upward movement of the bar 7 on its pivot. The forward end of the bar 7 has pivoted thereto an elevator element 12 which includes an upwardly and rearwardly extending portion 13 terminating into a horizontally disposed portion 14 adapted to terminate over the sickle. The forward end of the elevator element projects beyond the forward end of the bar 7 and is bent upon itself in V-shaped formation to form a shoe 15 adapted to ride upon the surface of the ground. The portion 14 carries a slotted arm 16 received between a bracket 17 which constitutes spaced plates 18 pivoted to the bar 7 adjacent its pivot 9, as shown at 19. A bolt or like fastener 20 connects the plates 18 of the bracket and also extends through the slot in the arm 16 whereby the elevator element 13 may be raised and lowered upon its pivot for the purpose of varying the inclination thereof.

While I have shown and described the preferred embodiment of my invention, it will be understood that minor changes in construction, combination and arrangement of parts may be made without departing from the spirit and scope of my invention, as claimed.

Having described the invention, I claim:

1. A guard comprising a supporting arm, a bar pivoted to the supporting arm, means for limiting the pivotal movement of the bar relative to the arm, and an elevator element having one end pivoted to one end of the bar and its other end adjustably secured to said bar.

2. A guard comprising a supporting arm having an upwardly curved portion to form a guide, a bar pivoted to said arm and engaged by the guide, means for limiting the pivotal movement of the bar relative to the arm, and an elevator element carried by said bar.

3. A guard comprising a supporting arm having an upwardly curved portion to form a guide, a bar pivoted to said arm and engaged by the guide, means for limiting the pivotal movement of the bar relative to the arm, an elevator element carried by said bar, said elevator element having a portion bent to form a shoe to engage the ground in advance of the bar.

4. A guard comprising a supporting arm, a bar pivoted to said supporting arm, means for limiting the pivotal movement of the bar, said bar projecting forwardly of the forward end of the supporting arm, an elevator element pivoted to the forward end of the bar, and projecting rearwardly and forwardly of said end of the bar, and having its forward end bent upon itself to form a shoe, and means adjustably connecting the elevator element to the bar adjacent its pivotal end.

COE R. BRADEN.